(12) United States Patent
Pearson

(10) Patent No.: US 8,840,042 B2
(45) Date of Patent: Sep. 23, 2014

(54) DRY FLUE GAS DESULFURIZATION SYSTEM WITH DUAL FEED ATOMIZER LIQUID DISTRIBUTOR

(75) Inventor: Thomas Edwin Pearson, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 741 days.

(21) Appl. No.: 12/629,916

(22) Filed: Dec. 3, 2009

(65) Prior Publication Data

US 2010/0147968 A1 Jun. 17, 2010

Related U.S. Application Data

(60) Provisional application No. 61/122,227, filed on Dec. 12, 2008.

(51) Int. Cl.
| | | |
|---|---|---|
| *B05B 3/10* | (2006.01) | |
| *B05B 3/02* | (2006.01) | |
| *F23D 11/04* | (2006.01) | |
| *B01D 53/50* | (2006.01) | |
| *B01D 53/79* | (2006.01) | |

(52) U.S. Cl.
CPC ............ *B05B 3/1021* (2013.01); *B01D 53/504* (2013.01); *B01D 53/79* (2013.01); *B05B 3/1035* (2013.01); *B01D 53/505* (2013.01); *B01D 2257/204* (2013.01)
USPC .................. 239/224; 239/214.25; 239/222.11

(58) Field of Classification Search
CPC .......... B05B 3/1014; F23D 11/04; B44D 5/10
USPC .................... 239/223, 224, 214, 214.25, 222, 239/222.11, 222.19; 423/DIG. 8
See application file for complete search history.

(56) References Cited

U.S. PATENT DOCUMENTS

| | | | | |
|---|---|---|---|---|
| 1,468,118 | A | * | 9/1923 | MacLachlan ............ 239/222.11 |
| 1,468,119 | A | * | 9/1923 | MacLachlan ................... 261/88 |
| 1,823,844 | A | | 9/1931 | Champlain |
| 4,246,242 | A | | 1/1981 | Butler et al. |
| 4,388,283 | A | * | 6/1983 | Abrams et al. ........... 423/244.07 |
| 4,755,366 | A | * | 7/1988 | Schwartzbach ............... 423/235 |
| 4,874,400 | A | * | 10/1989 | Jury ................................. 95/38 |
| 5,271,904 | A | * | 12/1993 | Esposito et al. ............. 422/105 |
| 5,284,637 | A | | 2/1994 | Merritt et al. |
| 6,585,169 | B2 | * | 7/2003 | Andersson ........................ 239/7 |
| 2003/0180283 | A1 | | 9/2003 | Batycky et al. |

FOREIGN PATENT DOCUMENTS

| | | |
|---|---|---|
| EP | 0 191 557 | 8/1986 |
| EP | 0 310 151 | 4/1989 |

OTHER PUBLICATIONS

PCT International Search Report and the Written Opinion of the International Searching Authority, dated Mar. 2, 2010—(PCT/US2009/066736).

* cited by examiner

*Primary Examiner* — Justin Jonaitis
(74) *Attorney, Agent, or Firm* — Rita D. Vacca

(57) ABSTRACT

An atomizer system 160 for use in a spray dry absorber 130, the atomizer system 160 includes a support member 161, an atomizing disc 162 rotatably coupled to the support member 161, a first feed line 163 for delivery of a reagent slurry 163*a* to a delivery area 165 and a second feed line 164 for delivery of a dilution liquid 164*a* to the delivery area 165. The delivery area 165 is positioned within the atomizer system 160 to reduce scale buildup generated by interaction of the reagent slurry 163*a* and the dilution liquid 164*a*.

9 Claims, 7 Drawing Sheets

DRY FLUE GAS DESULFURIZATION SYSTEM WITH DUAL FEED ATOMIZER LIQUID DISTRIBUTOR

CROSS-REFERENCE TO RELATED APPLICATIONS

This application claims the benefit under 35 U.S.C. §119(e) of U.S. Provisional Application Ser. No. 61/122,227, filed on Dec. 12, 2008, the contents of which is incorporated by reference herein in its entirety.

TECHNICAL FIELD

The present disclosure relates generally to a dual feed atomizer liquid distributor, and more particularly, to a dry flue gas desulfurization system for processing a flue gas stream in which a dual feed atomizer liquid distributor is provided.

BACKGROUND

Combustion of fuel, particularly carbonaceous materials such as fossil fuels and waste, results in flue gas streams that contain impurities, such as mercury (Hg), sulfur oxides (SOx), nitrogen oxides (NOx), and particulates, such as fly ash, which must be removed or reduced to a more acceptable level prior to releasing the flue gas to the environment. In response to regulations in place in many jurisdictions, numerous processes and apparatuses have been developed to remove or reduce the levels of impurities and particulates in the flue gas.

The typical method of reducing flue gas particulates, Hg, NOx, and SOx impurities from steam generating boilers powered by fuel combustion is by the use of flue gas treatment equipment. Such equipment includes electrostatic precipitators (ESP), fabric filter bag houses, catalytic systems, wet flue gas desulfurization systems and/or dry flue gas desulfurization systems (referred to as WFGD and DFGD respectively).

In some flue gas stream processing systems, removal of acidic components, such as SOx, is facilitated through the use of a DFGD system, wherein a reagent slurry or solution contacts the flue gas stream and reacts with the SOx present therein. Current DFGD systems utilize spray dryer absorbers having an atomizer system that receives the reagent slurry, typically in combination with a dilution liquid.

Delivery of the reagent slurry or solution to the atomizer system in combination with the dilution liquid results in scale buildup in the delivery hose. Scale buildup results in shut down of the plant or system for necessary cleaning and maintenance. As will be appreciated, plant or system shut down, as well as the related cleaning and maintenance of the system and/or plant, is time consuming and costly. Accordingly, a system and process for reducing scale buildup in an atomizer system would result in fewer plant or system shut-downs for cleaning and maintenance purposes.

SUMMARY OF THE INVENTION

According to aspects illustrated herein, there is provided an atomizer system for use in a spray dry absorber, the atomizer system comprising: a support member; an atomizing disc rotatably coupled to the support member; a first feed line for delivery of a reagent slurry to a delivery area; and a second feed line for delivery of a dilution liquid to the delivery area, the delivery area positioned within the atomizer system to reduce scale buildup generated by interaction of the reagent slurry and the dilution liquid.

According to other aspects illustrated herein, there is provided a method for reducing scale buildup in an atomizer system, the method comprising the steps of: providing an atomizer system to a flue gas processing system, the atomizer system having a support member; a delivery area; an atomizing disc; a first feed line; and a second feed line; delivering a reagent slurry to the atomizer system, the reagent slurry delivered through the first feed line to the delivery area; delivering a dilution liquid to the atomizer system, the dilution liquid delivered through the second feed line to the delivery area; and positioning the delivery area in the atomizer system to reduce scale buildup generated by interaction of the reagent slurry and the dilution liquid.

The above described and other features are exemplified by the following figures and detailed description.

BRIEF DESCRIPTION OF THE DRAWINGS

Referring now to the Figures, which are exemplary embodiments, and wherein like elements are numbered alike.

DETAILED DESCRIPTION

Figure 1:
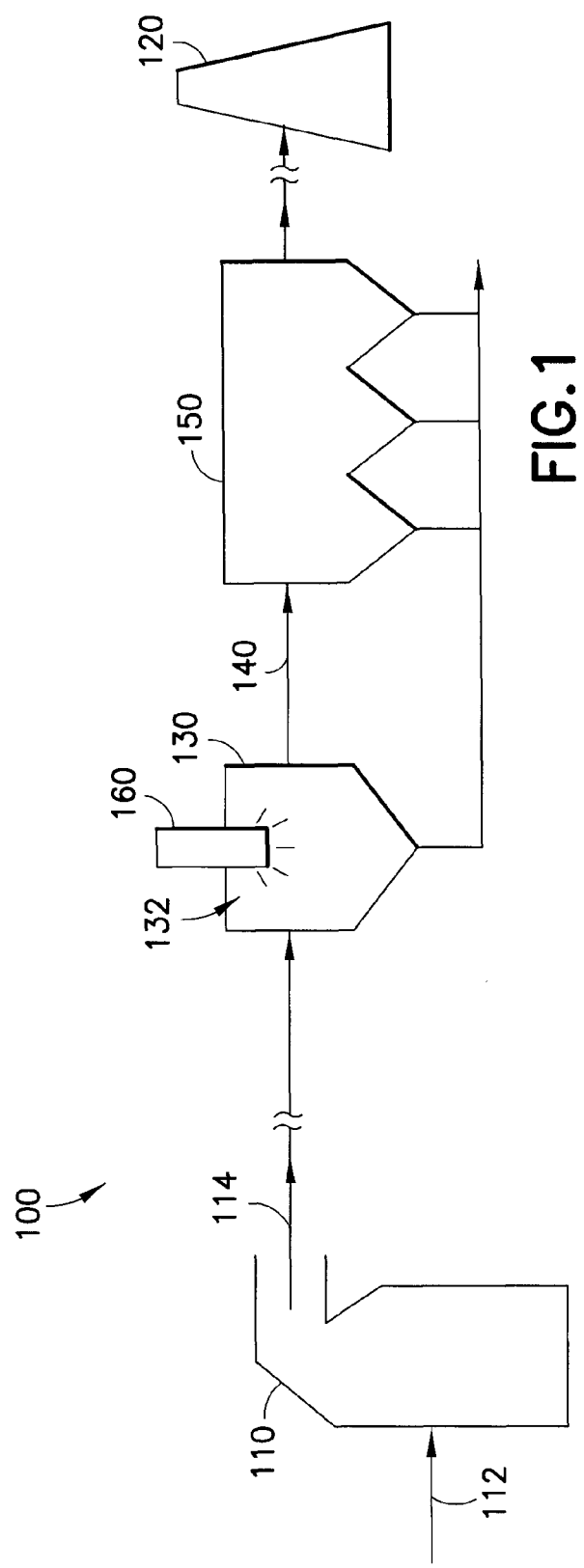
FIG. 1 is a schematic of a flue gas stream processing system according to an embodiment described herein.

FIG. 1 illustrates a flue gas stream processing system 100, which includes a combustion chamber 110 that combusts a fuel 112, such as coal, to produce a flue gas stream 114. Flue gas stream 114 may contain contaminants, including, but not limited to particulates, sulfur oxides (SOx), nitrogen oxides (NOx), mercury, carbon dioxide ($CO_2$), and the like. Prior to being released to an environment via a stack 120 or other ventilation arrangement, the flue gas stream 114 typically undergoes processing to remove or reduce the amount of contaminants present therein.

In one embodiment, as shown in FIG. 1, the flue gas stream 114 proceeds to a spray dry absorber 130. While not shown in FIG. 1, it is contemplated that the flue gas stream 114 may proceed through one or more devices, such as an air preheater, prior to being introduced to the spray dry absorber 130.

In the spray dry absorber 130, the flue gas stream 114 interacts with a reagent that facilitates the removal of acidic components, such as SOx, hydrogen chloride (HCl), hydrogen fluoride (HF), and hydrogen bromide (HBr), from the flue gas stream to create flue gas stream 140 containing a reduced level of acid gases. As shown in FIG. 1, the flue gas stream 140 containing a reduced level of acid gases is provided to a particulate remover 150 prior to being released to an environment via stack 120. The particulate remover 150 may be a bag house, an electrostatic precipitator (ESP), a mechanical dust collector, or the like. The flue gas stream processing system 100 is not limited by the process described in the present embodiment since it is contemplated that the flue gas stream 140 containing a reduced level of acid gases may pass through other flue gas processing devices, including, but not limited to, NOx removal devices, cooling towers, air pre-heaters, and the like.

Removal of acidic components from the flue gas stream 114 is often conducted to maintain compliance with emission regulations. In one embodiment, acidic components present in the flue gas stream 114 are removed by providing the flue gas stream to the spray dry absorber 130 where it contacts an atomized reagent 132 generated by an atomizer system 160. The atomized reagent 132 facilitates the absorption of the acidic components present in the flue gas stream 114.

As shown in FIGS. 2-5, the atomizer system 160 includes an atomizing disc 162 rotatably coupled to a support member 161. In one example, the support member 161 includes a rotating shaft 161a contained in a stationary housing 161b with the atomizing disc 162 coupled to the rotating shaft. The atomizer system 160 is a dual feed system that includes a first feed line 163 and a second feed line 164.

The first feed line 163 delivers a reagent slurry or solution 163a (hereinafter referred to as a reagent slurry) to a delivery area 165 within the atomizer system 160. The reagent slurry 163a may contain a liquid, such as water, and any reagent that facilitates the absorption and removal of acidic components from the flue gas stream 114. In one example, the reagent slurry 163a may contain lime (calcium hydroxide) as the reagent. In another example, the reagent slurry 163a may contain activated carbon as the reagent. In a further example, the reagent slurry 163a may contain a combination of lime and activated carbon as the reagent.

The second feed line 164 delivers a dilution liquid 164a to the delivery area 165 within the atomizer system 160. In one embodiment, the dilution liquid 164a is water. In another embodiment, the dilution liquid 164a is untreated water from a cooling tower (not shown) within the flue gas stream processing system 100. In yet another embodiment, the dilution liquid 164a may be treated fresh water (potable water) or untreated water from a cooling tower, a well, a river, or other waste water from treatment processes within or supporting the flue gas stream processing system 100.

In one embodiment, the reagent slurry 163a and the dilution liquid 164a are delivered to the atomizer system 160 at equal delivery rates. The delivery rate of the reagent slurry 163a and the dilution liquid 164a will vary from system to system and may be dependent on the needs of the user, the application in which the atomizer system 160 is utilized in, as well as the capacity, e.g., size and power, of the atomizer system.

In one example, the reagent slurry 163a and the dilution liquid 164a are delivered to the atomizer system at an equal delivery rate having a combined total delivery rate not exceeding about 200 gallons per minute (gpm). For instance, the reagent slurry 163a may be delivered at a rate of 100 gpm while the dilution liquid 164a may be delivered at a rate of 100 gpm, for a total delivery rate of 200 gpm. The delivery rate is not limited in this regard, since it is contemplated that the reagent slurry 163a and the dilution liquid 164a can be delivered at rates in any combination equal to or less than about 200 gpm, e.g., delivery rate of reagent slurry is 10 gpm, while delivery rate of dilution liquid is 10 gpm; delivery rate of reagent slurry is 50 gpm, while delivery rate of dilution liquid is 50 gpm.

In another embodiment, the reagent slurry 163a and the dilution liquid 164a are delivered to the atomizer system 160 at unequal rates. The delivery rate of the reagent slurry 163a and the dilution liquid 164a will vary from system to system and may be dependent on the needs of the user, the application in which the atomizer system 160 is utilized in, as well as the capacity, e.g., size and power, of the atomizer system.

In one example, the reagent slurry 163a and the dilution liquid 164a are delivered to the atomizer system 160 at an unequal delivery rate having a combined total delivery rate not exceeding about 200 gallons per minute (gpm). For instance, the reagent slurry 163a may be delivered at a rate of about 50 gpm while the dilution liquid 164a may be delivered at a rate of about 150 gpm, for a total delivery rate of about 200 gpm. The delivery rate is not limited in this regard, since it is contemplated that the reagent slurry 163a and the dilution liquid 164a can be delivered at rates in any combination equal to or less than about 200 gpm, e.g., delivery rate of reagent slurry is about 10 gpm, while delivery rate of dilution liquid is about 25 gpm; delivery rate of reagent slurry is about 50 gpm, while delivery rate of dilution liquid is about 60 gpm; delivery rate of reagent slurry is about 18 gpm, while delivery rate of dilution liquid is about 28 gpm; delivery rate of reagent slurry is about 22 gpm, while delivery rate of dilution liquid is about 19 gpm; delivery rate of reagent slurry is about 19 gpm, while delivery rate of dilution liquid is about 25 gpm; delivery rate of reagent slurry is about 17 gpm, while delivery rate of water is about 24 gpm.

Figure 2:
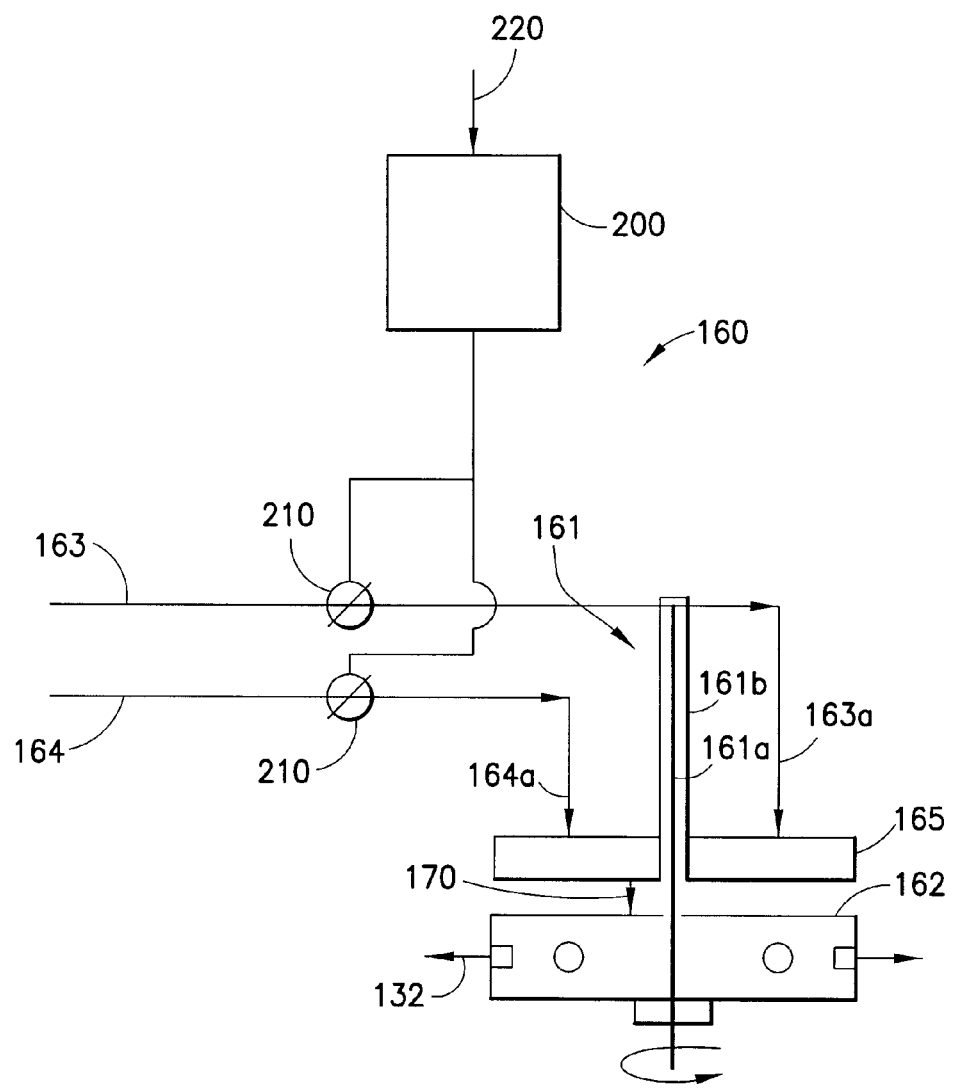
FIG. 2 is a cross-sectional block diagram of an atomizer system according to an embodiment described herein.

The delivery rates of the reagent slurry 163a and the dilution liquid 164a may be controlled by a controller 200 as shown in FIG. 2, which is in communication with one or more valves 210. Controller 200 may be pre-programmed to control the delivery rates of the reagent slurry 163a and the dilution liquid 164a. Alternatively, operator commands 220 may vary or set delivery rates by providing instruction to the controller 200. For example, controller 200 may selectively close or open one or both of the valves 210 in order to allow more or less of the reagent slurry 163 and/or the dilution liquid 164a to the atomizer system 160. While only illustrated in FIG. 2, it is contemplated that the controller 200, as well as valves 210 and operator commands 220, may be employed in any or all of the embodiments set forth herein.

The delivery area 165 is positioned within the atomizer system 160 to reduce scale buildup generated by interaction of the reagent slurry 163a and the dilution liquid 164a. The delivery area 165 is positioned close to the atomizing disc 162 in order to reduce the formation of scale deposits that form in the atomizer system 160.

As is generally known, when the reagent slurry 163a and the dilution liquid 164a interact, scale deposits form. Formation of scale deposits clog the atomizer system 160 and necessitates periodic shut down of the atomizer system for maintenance and cleaning. It has been found that when the reagent slurry 163a and the dilution liquid 164a are maintained separately within the atomizer system 160 for as long as possible, scale formation is reduced.

One manner to separate the reagent slurry 163a and the dilution liquid 164a is to independently control the delivery of both the reagent slurry and the dilution liquid to the delivery area 165 positioned in close proximity to the atomizing disc 162, which subsequently atomizes the reagent slurry and dilution liquid to form the atomized reagent 132.

In a particular example, as shown in FIG. 2, the delivery area 165 is a stationary device positioned at a location above and near the surface of the atomizing disc 162. The delivery area 165 may be a stationary plate having a groove, a channel or multiple orifices, which is near the surface of the atomizing disc 162. In this embodiment, the reagent slurry 163a and the dilution liquid 164a are separately delivered to the delivery area 165 via the first feed line 163 and the second feed line 164 respectively. Once delivered to the delivery area 165, the reagent slurry 163a and the dilution liquid 164a interact and are dispensed as an atomizing liquid 170 to the atomizing disc 162, where it is atomized to form the atomized reagent 132.

Figure 3:
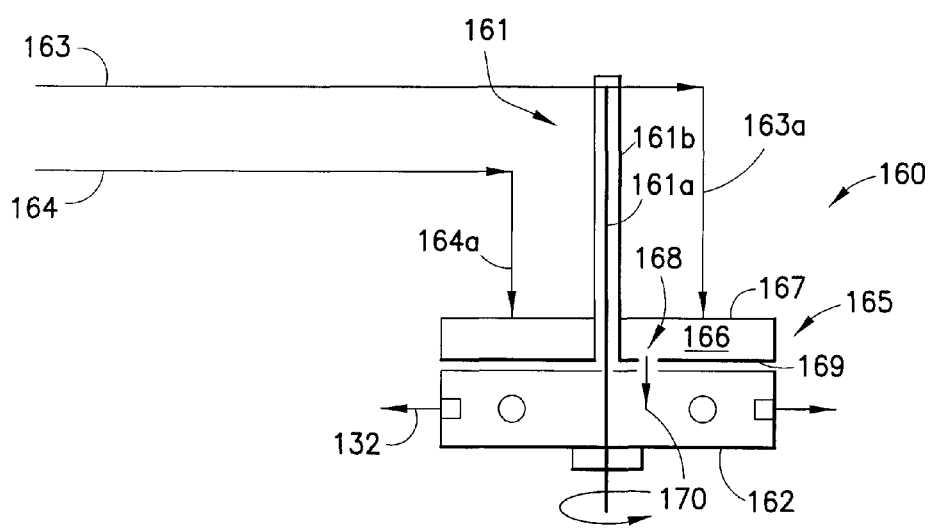
FIG. 3 is a cross-sectional block diagram of an atomizer system according to an embodiment described herein.

In another example, as shown in FIG. 3, the delivery area 165 is an internal chamber 166 of a liquid distributor 167 of the atomizer system 160. The liquid distributor 167 is coupled to the support member 161 at a location above and in close proximity to the atomizing disc 162. In one embodiment, the liquid distributor 167 is fixedly coupled to the stationary housing 161b. The atomizer system 160 is not limited to the particular device described, since it is contemplated that the liquid distributor 167 may be rotatably coupled to the support member 161.

As shown in FIG. 3, the first feed line 163 delivers the reagent slurry 163a to the internal chamber 166 of the liquid distributor 167. The dilution liquid 164a is separately and independently delivered to the internal chamber 166 of the liquid distributor 167 through the second feed line 164. The reagent slurry 163a and the dilution liquid 164a interact within the internal chamber 166 of the liquid distributor 167 prior to dispensing to the atomizing disc 162 for atomizing.

In one embodiment, the liquid distributor 167 has an opening 168. The opening 168 extends from the internal chamber 166 of the liquid distributor 167 to an exterior portion 169 of the liquid distributor. The opening 168 is positioned at a location in communal proximity to the atomizing disc 162. While FIG. 3 illustrates the opening 168 being positioned to the right of the support member 161, the atomizer system 160 is not limited in this regard as it is contemplated that the opening 168 may be positioned at any point on the external portion 169 of the liquid distributor in communal proximity of the atomizing disc 162.

In FIG. 3, the reagent slurry 163a and the dilution liquid 164a are provided to the internal chamber 166 of the liquid distributor 167, where they contact and interact to form an atomizing liquid 170. The atomizing liquid 170 exits the internal chamber 166 of the liquid distributor 167 to the atomizing disc 162 by streaming through the opening 168. The atomizing liquid 170 is atomized by the atomizing disc 162 to form the atomized reagent 132.

Figure 4:
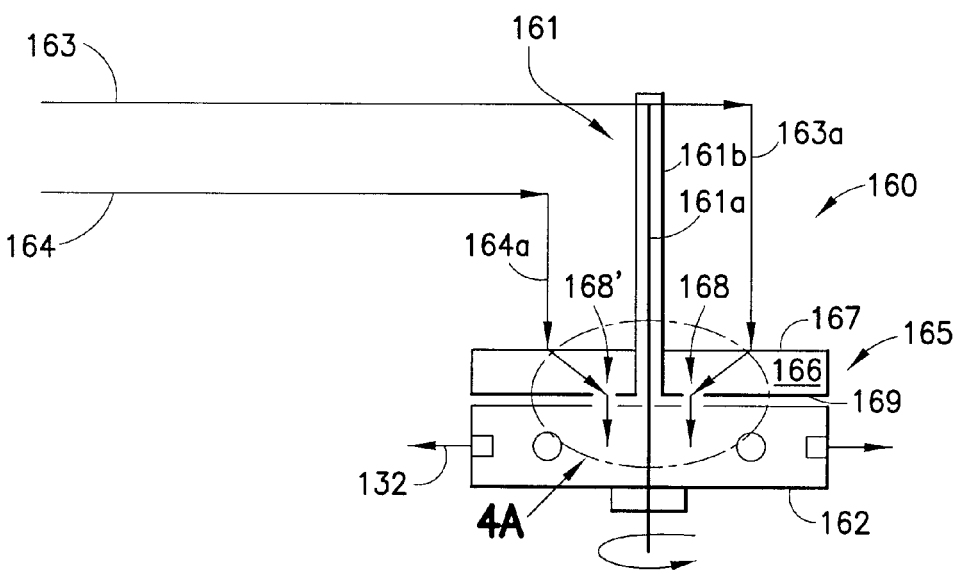
FIG. 4 is a cross-sectional block diagram of an atomizer system according to an embodiment described herein.

In another embodiment, as show in FIG. 4, the liquid distributor 167 has a first opening 168 and a second opening 168'. Each of the first and the second openings 168, 168' extend from the internal chamber 166 to an exterior portion 169 of the liquid distributor 167. As shown in FIG. 4, the first opening is positioned opposite the first feed line 163 while the second opening 168' is positioned opposite the second feed line 164. Both the first and the second openings 168, 168' are positioned in communal proximity to the atomizing disc 162.

Figure 4A:
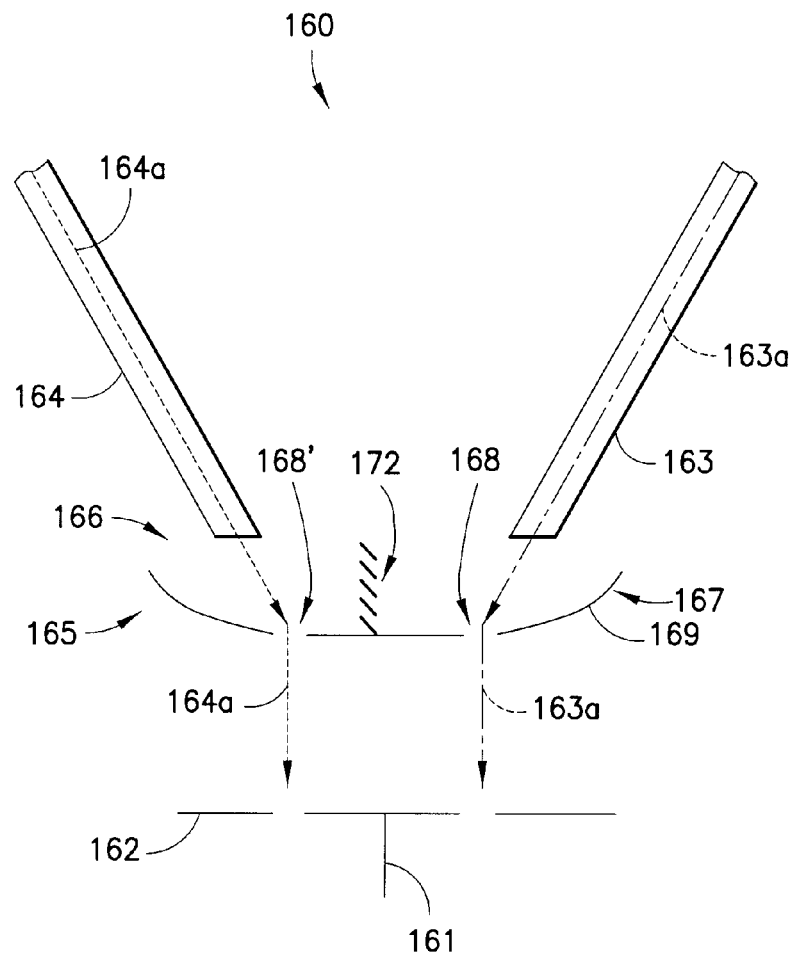
FIG. 4A is a simplified block diagram view of an atomizer system illustrated in FIG. 4.

FIG. 4A depicts a simplified block diagram view of FIG. 4. As shown in more detail in FIG. 4A, the internal chamber 166 of the liquid distributor 167 may include a bather 172, which is positioned between the first opening 168 and the second opening 168'. The barrier 172 segregates interaction between the reagent slurry 163a and the dilution 164a that is delivered to the internal chamber 166 of the liquid distributor.

In one embodiment, the barrier 172 may be a scale barrier that forms upon interaction of the reagent slurry 163a with the dilution liquid 164a in the internal chamber 166 of the liquid distributor 167. The scale barrier 172 segregates the reagent slurry 163a from the dilution liquid 164a such that a majority of the atomizing liquid forms beyond the external portion 169 of the liquid distributor 167. While only two openings 168, 168' are illustrated in FIGS. 4 and 4A, the liquid distributor is not limited in this regard since it is contemplated that more than two openings may be present.

The control of the feed rates of the reagent slurry 163a and the dilution liquid 164a results in the formation of the scale barrier 172. The control of the feed rates allows the scale barrier 172 to form in the internal chamber 166 of the liquid distributor 167 without the formation of a large scale deposit, which would necessitate shut-down of the atomizer system 160 or the flue gas stream processing system 100.

After formation of the scale barrier 172 in the internal chamber 166 of the liquid distributor 167, the reagent slurry 163a that is delivered to the internal chamber 166 of the liquid distributor 167 exits through the first opening 168 and streams to the atomizing disc 162 without reacting with the dilution liquid 164a. Similarly, the dilution liquid 164a delivered to the internal chamber 166 of the liquid distributor 167 and exits through the second opening 168' and streams to the atomizing disc 162 without interacting with the reagent slurry 163a. The reagent slurry 163a and the dilution liquid 164a interact at the atomizing disc 162 forming the atomizing liquid 170, which is atomized to form the atomized reagent 132.

In another embodiment, the barrier 172 is a manufactured barrier that is placed in the internal chamber 166 of the liquid distributor 167 during set-up or retrofit of the atomizer system 160. The manufactured barrier functions in the same manner of the scale barrier in that it segregates the reagent slurry 163a from the dilution liquid 164a and allows the reagent slurry to enter the internal chamber 166 of the liquid distributor 167 and exit through the first opening 168 and the dilution liquid to enter the internal chamber and exit through the second opening 168'.

Figure 5:
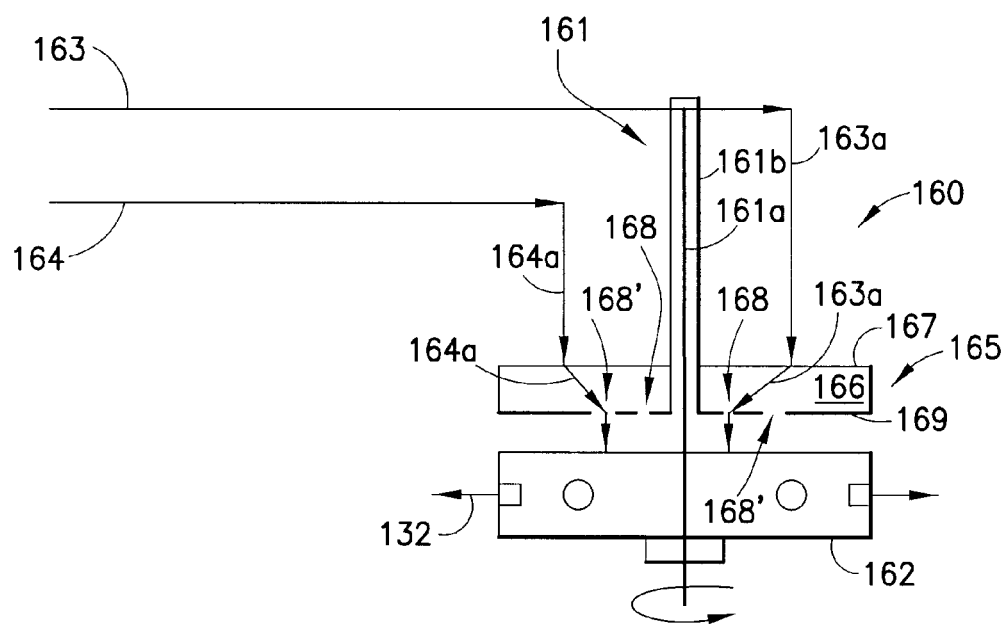
FIG. 5 is a cross-sectional block diagram of an atomizer system according to an embodiment described herein.

As shown in FIG. 5, in another embodiment, the first opening 168 and the second opening 168' are concentrically positioned with respect to one another. The positioning of the first opening 168 and the second opening 168' in a concentric manner allows the reagent slurry 163a and the dilution liquid 164a to be separately delivered to the atomizing disc 162, where it is atomized to form atomized reagent 132.

The positioning of the first opening 168 and the second opening 168' allow the atomizer system 160 to operate without disruption despite unequal delivery rates of the reagent slurry 163a and the dilution liquid 164a. For example, the positioning of the first opening 168 and the second opening 168' permit the atomizing disc 162 to rotate with little or no imbalance, i.e., vibrations.

Separate delivery of the dilution liquid 164a and the reagent slurry 163a to the atomizer system 160 reduces the need to shut down the atomizer system for maintenance and cleaning and thereby facilitates continuous operation of the atomizer system and flue gas stream processing system 100. Additionally, control of the delivery rates of the dilution liquid 164a and the reagent slurry 163a allows the atomizer system 160 to operate with little to no disruptions, such as vibrations of the atomizing disc 162.

The following example illustrates one embodiment of an atomizer system in accordance with the disclosure herein, which is utilized in a flue gas stream processing system.

EXAMPLE 1

To analyze an atomizer system in accordance with an embodiment disclosed herein, a spray dry absorber was fitted with an atomizer system having a liquid distributor having two feed lines coupled thereto. The first feed line delivered a reagent slurry containing calcium hydroxide and water, while the second feed line delivered a dilution liquid containing waste water from a cooling tower in the flue gas processing system. The liquid distributor had at least two openings, one of the openings positioned opposite the first feed line, and a second of the openings positioned opposite the second feed line.

The reagent slurry and dilution liquid were delivered to the liquid distributor and interacted to form a scale barrier within the liquid distributor such that any further reagent slurry and dilution liquid that entered the liquid distributor were maintained separately from one another. The reagent slurry exited the liquid distributor through the opening opposite the first feed line, while the dilution liquid exited the liquid distributor through the opening opposite the second feed line. After exiting the liquid distributor, the reagent slurry and the dilution liquid interacted and were atomized by an atomizing disc to form an atomized reagent.

Six separate trials were conducted to determine whether operational disruptions occur and to determine whether time periods between cleaning and maintenance of the atomizer system can be delayed.

In each of the six trials, the delivery rates of the reagent slurry and the dilution liquid were unequal. In the first trial, the delivery rate of the reagent slurry was 18.93 gallons per minute (gpm) while the delivery rate of the dilution liquid was 28.17 gpm. In the second trial, the delivery rate of the reagent slurry was 22.4 gpm, while the delivery rate of the dilution liquid was 19 gpm. In the third trial, the delivery rate of the reagent slurry was 19 gpm, while the delivery rate of the dilution liquid was 25 gpm. In the fourth trial, the delivery rate of the reagent slurry was 17.85 gpm, while the delivery rate of the dilution liquid was 24.67 gpm. In the fifth trial, the delivery rate of the reagent slurry was 13.17 gpm, while the delivery rate of the dilution liquid was 22.39 gpm. In the sixth trial, the delivery rate of the reagent slurry was 12.21 gpm, while the delivery rate of the dilution liquid was 28.43 gpm. The trials were spread out over a period of about six weeks.

Figure 6:
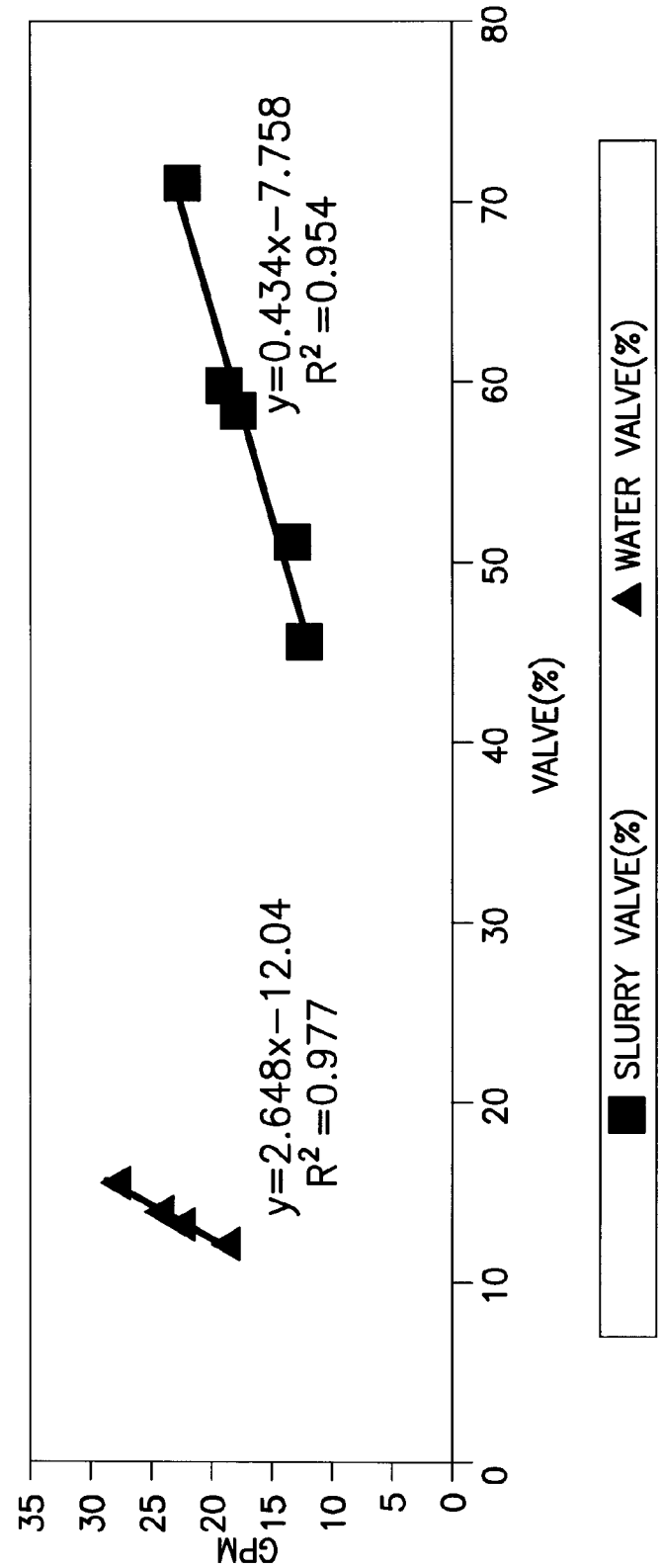
FIG. 6 is a chart illustrating the relationship between opening of a valve and a delivery rate of dilution liquid and reagent slurry.

Table 1 illustrates the different feed rates and resulting vibrations of the atomizer disc. Cleaning or maintenance of the atomizer system between the trials or after the sixth and final trial was not necessary. The chart of FIG. 6 illustrates the relationship between the opening of the valve (percent at which the valve is open) and the delivery rate of the dilution liquid and the reagent slurry.

TABLE 1

|  | Trial 1 | Trial 2 | Trial 3 | Trial 4 | Trial 5 | Trial 6 |
|---|---|---|---|---|---|---|
| Vibration (mil) | 0.05 | 0.1 | 0 | 0.03 | 0.23 | 0.08 |
| Dilution Liquid (gpm) | 28.17 | 19 | 25 | 24.67 | 22.39 | 28.43 |
| Reagent Slurry (gpm) | 18.93 | 22.4 | 19 | 17.85 | 13.17 | 12.21 |
| Dilution Liquid valve % | 15.3 | 12 | 13.76 | 13.68 | 12.9 | 15.41 |
| Reagent Slurry valve % | 59.75 | 71 | 59.65 | 58.3 | 51.06 | 45.51 |

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An atomizer system for use in a spray dry absorber, the atomizer system comprising:
   a support member;
   an atomizing disc rotatably coupled to the support member;
   a first feed line for delivery of a reagent slurry to a delivery area; and
   a second feed line for delivery of a dilution liquid to the delivery for contact between the reagent slurry and dilution liquid in the delivery area to produce an atomized reagent, the delivery area positioned within the atomizer system in communal proximity upstream the atomizing disc to reduce scale buildup in the delivery area generated by interaction of the reagent slurry and the dilution liquid prior to atomized reagent delivery to and atomization by the atomizing disc rotation;
   wherein the delivery area comprises a stationary plate positioned upstream the atomizing disc.

2. An atomizer system according to claim 1, further comprising:
   the stationary plate is a liquid distributor fixedly coupled to the support member at a location upstream the atomizing disc, the liquid distributor having an internal chamber and at least one opening;
   wherein the opening extends from the internal chamber to an exterior portion of the liquid distributor, the opening positioned in proximity to the atomizing disc.

3. An atomizer system according to claim 2, wherein the at least one opening includes a first opening and a second opening in the liquid distributor, each of the first and the second openings extending from the internal chamber to the exterior portion of the liquid distributor, the first opening and second opening positioned in proximity to the atomizing disc.

4. An atomizer system according to claim 3, wherein the first opening is positioned concentric to the second opening.

5. An atomizer system according to claim 3, wherein the first opening in the liquid distributor is positioned opposite the first feed line and the second opening in the liquid distributor is positioned opposite the second feed line.

6. An atomizer system according to claim 5, wherein the delivery area comprises a reagent slurry area and dilution liquid area defining a reagent slurry/dilution liquid interface therebetween, the reagent slurry/dilution liquid interface segregating further interaction of the reagent slurry and the dilution liquid in the internal chamber of the liquid distributor.

7. An atomizer system according to claim 5, further comprising a manufactured barrier positioned in the internal chamber of the liquid distributor, the manufactured barrier segregating interaction of the reagent slurry and the dilution liquid in the internal chamber of the liquid distributor.

8. An atomizer system according to claim 1, further comprising a controller; and at least one valve, the controller configured to control delivery rates of the reagent slurry and the dilution liquid to the delivery area.

9. An atomizer system according to claim 1, wherein the reagent slurry comprises calcium hydroxide.

* * * * *